United States Patent [19]
Arntzen

[11] 4,110,517
[45] Aug. 29, 1978

[54] ELECTROCHEMICAL CELL DESIGN

[75] Inventor: John D. Arntzen, Naperville, Ill.

[73] Assignee: The United States of America as represented by the United States Department of Energy, Washington, D.C.

[21] Appl. No.: 868,585

[22] Filed: Jan. 11, 1978

[51] Int. Cl.² ........................................... H01M 10/38
[52] U.S. Cl. .................................. 429/133; 429/138; 429/162; 429/163
[58] Field of Search ............... 429/133, 138, 162, 163, 429/139, 156, 128, 218, 199, 102, 103

[56] References Cited
U.S. PATENT DOCUMENTS

| 3,887,396 | 6/1975 | Walsh et al. | 429/128 |
| 3,933,520 | 1/1976 | Gay et al. | 429/199 X |
| 3,947,291 | 3/1976 | Yao et al. | 429/103 |

Primary Examiner—Anthony Skapars
Attorney, Agent, or Firm—Dean E. Carlson; Frank H. Jackson; Hugh W. Glenn

[57] ABSTRACT

An electrochemical cell includes two outer electrodes and a central electrode of opposite polarity, all nested within a housing having two symmetrical halves which together form an offset configuration. The outer electrodes are nested within raised portions within the side walls of each housing half while the central electrode sealingly engages the perimetric margins of the sidewall internal surfaces. Suitable interelectrode separators and electrical insulating material electrically isolate the central electrode from the housing and the outer electrodes. The outer electrodes are electrically connected to the internal surfaces of the cell housing to provide current collection. The nested structure minimizes void volume that would otherwise be filled with gas or heavy electrolyte and also provides perimetric edge surfaces for sealing and supporting at the outer margins of frangible interelectrode separator layers.

10 Claims, 2 Drawing Figures

ELECTROCHEMICAL CELL DESIGN

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to the design of electrochemical cells. It has particular application in those cells that employ molten electrolytic salt and operate at high temperatures. Other conventional cells employing aqueous electrolyte and more moderate temperatures might also beneficially include the present cell design.

A substantial amount of work has been done in the development of high-temperature electrochemical cells which exhibit high specific energy. Much of this development has involved cells including alkali metals and their alloys as negative electrodes and chalcogens or metal chalcogenides as positive electrode materials. Such cells employ molten salt electrolyte and consequently operate at elevated temperatures. Special ceramic materials are required as separators and other sealing components within these high-temperature corrosive environments.

Molten salts of the alkali metal and alkaline earth metal halides are often selected as electrolyte for these type cells. Such salts are quite dense, having specific gravities in the range of 3 to 5 such that, if used in large quantities, the salts will significantly add to the cell weight.

Many of the corrosive resistant and high-temperature ceramic materials such as yttria, boron nitride, silicon nitride, aluminum nitride, calcium zirconate and magnesium oxide are difficult and expensive to fabricate into strong porous layers suitable for use as interelectrode separators. Where more frangible forms such as foams and felts are employed, these materials tend to break at corners and ends, introducing the risk of electrical shorting.

One potential field of use for these new electrochemical cells is that of electrical vehicle propulsion. In such applications, the energy storage capability per unit weight (specific energy) become of particular importance. These considerations and other problems associated with past electrochemical cell developments are illustrated in the following prior art.

PRIOR ART STATEMENT

The following patents relate to but do not disclose or suggest the electrochemical design of the present invention.

Walsh et al., U.S. Pat. No. 3,887,396, 3 June 1975, "Modular Electrochemical Cell". This patent illustrates an electrochemical cell design with a stack of three electrodes. The center electrode is of opposite polarity to the outer two electrodes. The cell includes void space that can be filled with electrolyte and shows an interelectrode separator wrapped as an envelope around the central electrode. It includes electrical terminals and feedthroughs at major surfaces rather than edge surfaces and does not attain good or full electrical contact between the upper electrode and the cell housing. This reference does not teach the offset housing structure with sealing surfaces at perimetric margins for supporting flat sheets of frangible refractory material as an interelectrode separator.

Gay et al., U.S. Pat. No. 3,933,520, 20 Jan. 1976, "Method of Preparing Electrodes with Porous Current Collector Structures and Solid Reactants for Secondary Electrochemical Cells". This patent shows an electrochemical cell with an electrical feedthrough at one end and two outer electrodes that are in full contact with the cell housing at major surfaces. It illustrates void volume that can contain molten electrolyte and shows an interelectrode separator bent and wrapped around the central electrode. It does not show the housing halves with raised central portions and perimetric margins for joining at the edges and providing support and sealing surfaces for the frangible interelectrode separators.

SUMMARY OF THE INVENTION

In view of these characteristics of the prior art systems, it is therefore an object of the present invention to provide an electrochemical cell design that minimizes void space filled with gases or dense electrolyte.

It is a further object to provide an electrochemical cell design suitable for frangible ceramic interelectrode separators.

It is a further object to provide an electrochemical cell design with housing components that can be conveniently fabricated and assembled.

It is also an object to provide such a cell design in which electrode edges are supported and restrained by the cell housing with a minimum of components.

In accordance with the present invention, an electrochemical cell has two outer electrodes and a central electrode of opposite polarity nested within an offset housing structure. The housing includes first and second halves adapted to engage together to define a cell containment volume. Each half has side and edge walls with the side walls including a major central raised portion above perimetric margins. The edge walls include inward sections circumscribing the raised sidewall portions and outward sections adapted to engage corresponding outward sections of a matching housing half. The housing halves are fixedly attached together at the outward edge portions. The outer two electrodes are each nested within one of the raised central portions of the housing side walls. The central electrode is nested in the containment volume circumscribed by the outward sections of the edge walls. The central electrode includes perimetric margins on opposing side surfaces that face the corresponding internal surfaces of the side wall perimetric margins. These margins seal and support an electrically insulative separator between the inner and outer electrodes at the separator margins.

In more specific aspects of the invention, the two housing halves are symmetrical with one another such that each can be fabricated in a single stamping or pressing operation. The halves are fixedly attached together at an outwardly extending flange on the outward edge surfaces of each housing half. The resulting housing is of offset prismatic form with greater side surface dimensions than thickness. The combined flange member can be employed to make electrical connection to the housing for electrical access to the outer electrodes which are electrically attached to the internal housing surfaces. The outer electrodes are snugly nested within the raised central portion of each housing half for full electrical contact, restraint and support. A frame member with a channel-shaped cross section snugly grips and circumscribes the central electrode to form its outer margins. These central electrode margins provide sealing surfaces on one side of each interelectrode separator opposite to the perimetric margins of the internal side walls.

BRIEF DESCRIPTION OF THE DRAWINGS

The present invention is illustrated in the accompanying drawings wherein.

DETAILED DESCRIPTION OF THE PREFERRED EMBODIMENT

Figure 1:
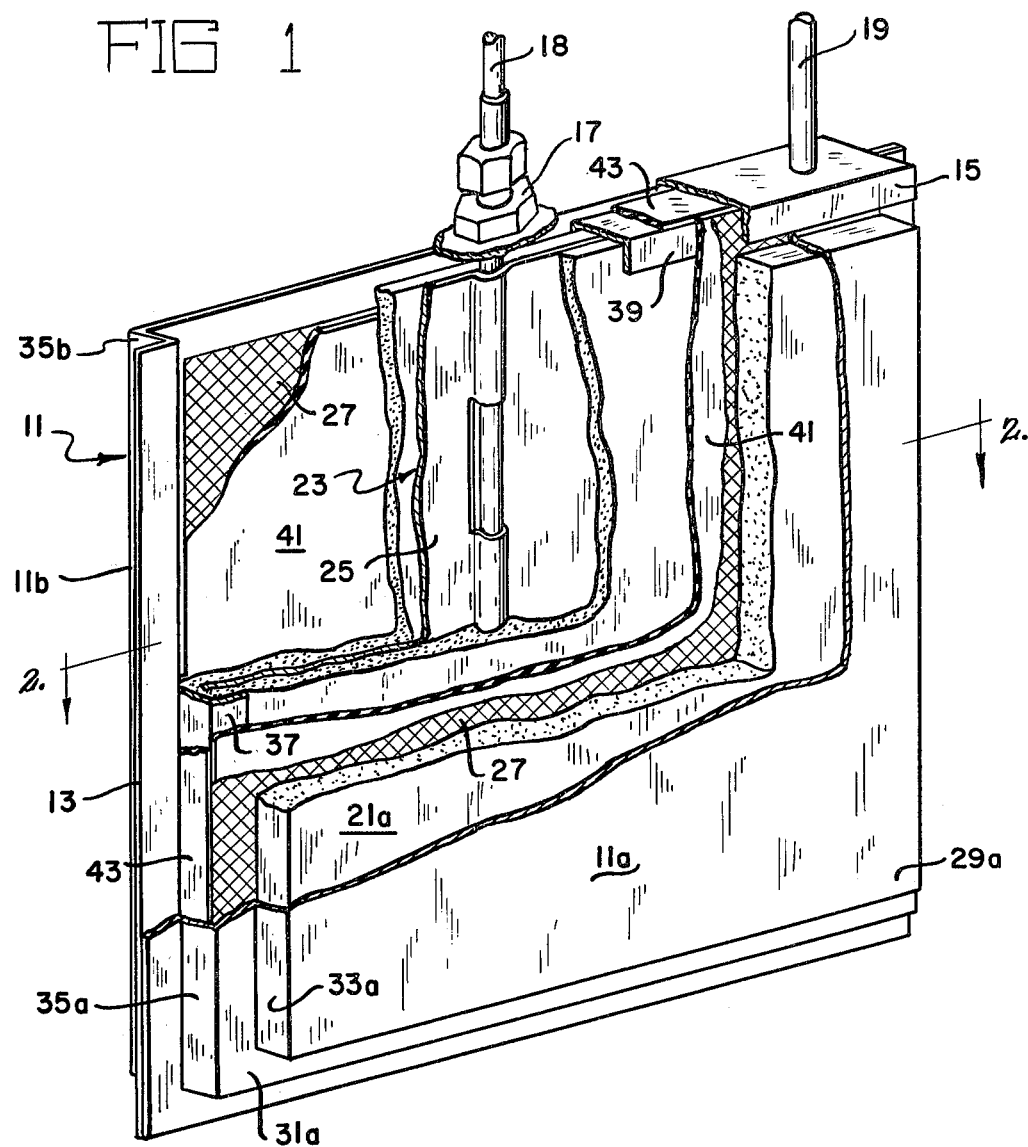
FIG. 1 is a perspective view partially broken away of an electrochemical cell.

In FIG. 1 an electrochemical cell design is shown with an offset shaped housing 11. The housing is divided along its length and breadth into two housing halves 11a and 11b attached together at the center of the edge surfaces. A flange 13 is illustrated around three sides of the cell housing to provide convenient surfaces for attaching the two halves together by an appropriate metallurgical bonding method such as welding, brazing or soldering. Flange 13 can include mating flange halves on each housing half. The fourth edge of the cell housing is suitably sealed with a cover 15 provided with access for an electrical feedthrough 17 and electrolyte fill 19.

The electrochemical cell includes two outer electrodes 21a and 21 b and a central electrode 23. The central electrode is illustrated with a suitable plate-like, metal current collector 25 in electrical communication with an electrical conductor 18 passing through an electrical feedthrough 17. The outer electrodes 21a, 21b are electrically connected such as by metallurgical bonding to the cell housing 11. Electrical connection from outside electrical loads and bus bars to the cell housing and the outer electrodes can be made at any suitable location, such as to flange 13 by clamp-type or metallurgical connections.

Each of the cell housing halves include at their side walls a central raised portion 29a and 29b. These raised portions are located within perimetric margins 31a and 31b. The edge walls of the housing structures include inward sections 33a and 33b circumscribing the raised central portions 29a, 29b of each housing half 11a, 11b. Outward sections 35a and 35b of the housing edges extend to flange 13 where the housing halves are bonded together.

Each of the outer electrodes 21a, 21b are illustrated as snugly nested in the containment volume defined by the central raised portions 29a and 29b. This eliminates void volume and provides structural support and electrical contact to the outer electrode at all edge surfaces and one side surface. A screen or other mesh-like structure 27 can be included as illustrated to contain outer electrodematerials, e.g. particles, and provide further electrical contact. The screen 27 can be metallurgically bonded to the internal surface of perimetric margins 31a, 31b.

Figure 2:
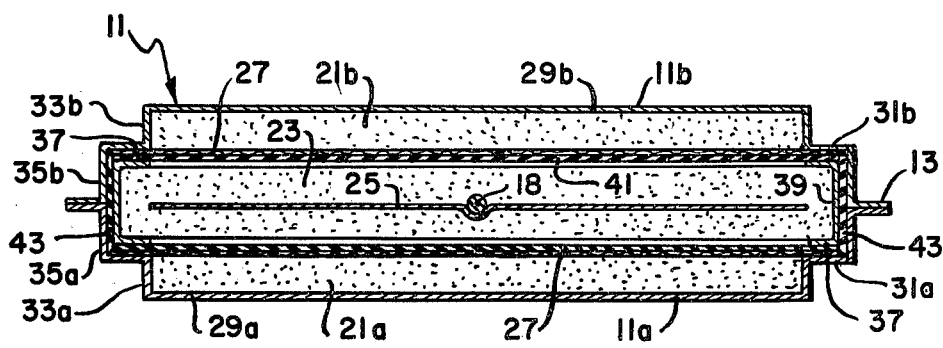
FIG. 2 is a cross-sectional view of the FIG. 1 cell as indicated.

Central electrode 23 includes at opposite perimetric margins, smooth sealing and support surfaces 37 facing corresponding internal surfaces of the side-wall perimetric margins. Surfaces 37 are illustrated in FIGS. 1 and 2 as outer side surfaces of a channel-shaped frame 39. Frame 39 is illustrated as snugly gripping marginal portions of the central electrode material about the perimeter.

The central electrode is sized to have exposed side surface areas that closely match the side surface areas of the two outer electrodes. Therefore frame 39 has side surfaces 37 that closely correspond in width to the width of perimetric margins 31a. The widths of these margins are made small in relation to the overall electrode width (or length) to afford short diffusion distances for central electrode reactants located within the confines of channel-shaped frame 39.

An interelectrode separator 41 is disposed between each outer electrode and the central electrode. Separator 41 is sealingly supported at sealing surfaces 37 of the central electrode and the perimetric margins 31a and 31b of the internal side wall surfaces. When screen 27 is employed it can face the outer separator surfaces. This structure permits use of frangible ceramic and refractory materials such as felts and foams as the interelectrode separator. Refractory, electrically insulative materials of, for instance, yttria, boron nitride, aluminum nitride and silicon nitride are contemplated for high-temperature applications of 600°–900°K.

Edge surfaces of the central electrode can be electrically insulated from the cell housing by means of elongated strips 43 of electrically insulative material disposed at each of the central electrode edges. Strips 43 need not be of the same porous and frangible material employed as the interelectrode separator 41, as they need not accommodate electrolyte transport. Therefore solid layers of, for instance, boron nitride, magnesium oxide, yttria or other refractory electrically insulative material may be selected.

In one manner of assembling the electrochemical cell shown in the figures, separate housing halves 11a and 11b are individually fitted with outer electrodes 21a and 21b in their raised portions. At this point mesh or screen 27 can be conveniently soldered, brazed, welded or otherwise metallurgically attached to the margins.

The central electrode is fitted into channel 39. The two housing halves 11a and 11b can then be brought together with the central electrode 23 nested in the volume circumscribed by outer edge surfaces 35a and 35b. This is conveniently performed by positioning central electrode 23 with electrically insulative strips 43 at its edges in one housing half 11a and laying the other half 11b in place over the central electrode. The two housing halves can then be metallurgically bonded together at flange 13.

In the final steps the cover 15 with feedthrough 17 attached is fitted and sealed into place over the remaining electrode edge. Electrical conductor 18 passes through feedthrough 17 to provide electrical access to the central electrode 23.

Molten electrolyte is filled conveniently into the cell through tube 19 by attaching an open reservoir of liquid electrolyte and evacuating the system containing the cell and electrolyte reservoir. After the gases vent and the pressure is reestablished, the molten electrolyte completely fills the cell. A substantial amount of electrolyte can be initially introduced in solid form with the cell components, e.g. in the electrodes.

The present invention provides an improved cell design that minimizes the void space that would otherwise contain gases or heavy electrolyte liquid. Also the number of structural components are minimized to further reduce inactive cell weight. As another advantageous feature, this design provides support and restraint for frangible interelectrode separators that might not otherwise be adequately accommodated.

It will be clear that, although the invention is described in terms of a specific embodiment, various modifications in form and materials will occur to those skilled in the art in accordance with the claims.

The embodiments of the invention in which an exclusive property or privilege is claimed are defined as follows:

1. An electrochemical cell including an array of three electrodes with a central electrode of opposite polarity to two outer electrodes, comprising in combination:
   first and second housing halves adapted to engage together to define a cell containment volume, each housing half having side and edge walls, the side walls having a major central portion raised above offset perimetric margins, the edge walls including inward sections circumscribing the raised side-wall portions and including outward sections adapted to engage corresponding outward sections of a matching housing half;
   means for fixedly attaching said first and second housing halves together;
   outer electrodes of same polarity nested within the cell containment volume defined in each housing half by the raised central portion of the housing side walls;
   a central electrode nested in the containment volume circumscribed by the outward sections of the edge walls, said central electrode having perimetric margins on opposing side surfaces facing the corresponding, internal surfaces of the side-wall perimetric margins; and
   an electrically insulative separator, penetrable by liquid electrolyte, disposed between the central and each of the two outer electrodes and sealingly engaged between the perimetric margins of the center electrode and internal side-wall surfaces of the housing.

2. The electrochemical cell of claim 1 wherein each housing half is symmetrical with its corresponding opposite housing half.

3. The electrochemical cell of claim 1 wherein the housing halves engage together to form a prismatic housing of greater side surface dimensions than thickness.

4. The electrochemical cell of claim 1 wherein the housing halves are fixedly attached directly together on all but one edge, the one edge including means for electrical connection feedthrough and means for filling a liquid electrolyte.

5. The electrochemical cell of claim 1 wherein the means for fixedly attaching the housing halves together comprise outwardly extending flanges from the outward edge surface of each housing half.

6. The electrochemical cell of claim 1 wherein the outer electrodes are fixedly and electrically attached to the internal surfaces of the housing side walls.

7. The electrochemical cell of claim 1 wherein the outer electrodes are snugly nested in the volume defined by the raised central portions of the side walls and contact the internal surfaces of the side walls at each central raised portion and the internal surfaces of the edge walls at each inward section.

8. The electrochemical cell of claim 1 wherein the central electrode is circumscribed within a frame member having a channel-shaped cross section to provide the perimetric margins on opposite side surfaces of the central electrode, the central electrode and frame member extend between and are in electrically insulative engagement with opposing internal surfaces of the outward edge walls of the housing.

9. The electrochemical cell of claim 8 wherein a layer of electrically insulative material is disposed between and in contact with the channel-shaped frame member and the internal surfaces of the outward edge walls.

10. The electrochemical cell of claim 1 wherein the electrically insulative separator includes two separate sheets of frangible, porous, refractory oxide material.

* * * * *